(12) United States Patent
Ozer et al.

(10) Patent No.: US 7,200,266 B2
(45) Date of Patent: Apr. 3, 2007

(54) METHOD AND APPARATUS FOR AUTOMATED VIDEO ACTIVITY ANALYSIS

(75) Inventors: I. Burak Ozer, Plainsboro, NJ (US); Wayne H. Wolf, Princeton, NJ (US); Tiehan Lu, Princeton, NJ (US)

(73) Assignee: Princeton University, Princeton, NJ (US)

( * ) Notice: Subject to any disclaimer, the term of this patent is extended or adjusted under 35 U.S.C. 154(b) by 764 days.

(21) Appl. No.: 10/649,418

(22) Filed: Aug. 27, 2003

(65) Prior Publication Data

US 2004/0120581 A1   Jun. 24, 2004

Related U.S. Application Data

(60) Provisional application No. 60/406,567, filed on Aug. 27, 2002.

(51) Int. Cl.
*G06K 9/34* (2006.01)

(52) U.S. Cl. ............... 382/173; 382/224; 382/199; 382/103; 382/100; 382/107; 382/158; 382/419; 715/863

(58) Field of Classification Search ............... 382/173, 382/100, 103, 224, 195, 199, 168, 181; 348/143, 348/150, 590
See application file for complete search history.

(56) References Cited

U.S. PATENT DOCUMENTS

| | | | |
|---|---|---|---|
| 5,148,477 A | 9/1992 | Neely et al. | |
| 5,454,043 A | 9/1995 | Freeman | |
| 5,796,406 A | 8/1998 | Shigematsu et al. | |
| 6,057,845 A | 5/2000 | Dupouy | |
| 6,072,494 A | 6/2000 | Nguyen | |
| 6,147,678 A | 11/2000 | Kumar et al. | |
| 6,204,852 B1 | 3/2001 | Kumar et al. | |
| 6,222,465 B1 | 4/2001 | Kumar et al. | |
| 6,249,606 B1 | 6/2001 | Kiraly et al. | |
| 6,256,033 B1 | 7/2001 | Nguyen | |

(Continued)

OTHER PUBLICATIONS

Jeffrey Mark Siskind, "Visual Event Classification Via Force Dynamics", AAAI, 2000, pp. 1-7.
Matthew Brand, Nuria Oliver and Alex Pentland, "Coupled Hidden Markov Models for Complex Action Recognition", IEEE Computer Vision and Pattern Recognition Proceedings, 1997, pp. 1-6.
Andrew D. Wilson, Aaron F. Bobick, "Parametric Hidden Markov Models for Gesture Recognition", IEEE Transactions on Pattern Recognition and Machine Intelligence, vol. 21, No. 9, Sep. 1999, pp. 884-900.

*Primary Examiner*—Jingge Wu
*Assistant Examiner*—Ali Bayat
(74) *Attorney, Agent, or Firm*—Synnestvedt Lechner & Woodbridge LLP (57) ABSTRACT

The invention is a new method and apparatus that can be used to detect, recognize, and analyze people or other objects in security checkpoints, public-places, parking lots, or in similar environments under surveillance to detect the presence of certain objects of interests (e.g., people), and to identify their activities for security and other purposes in real-time. The system can detect a wide range of activities for different applications. The method detects any new object introduced into a known environment and then classifies the object regions to human body parts or to other non-rigid and rigid objects. By comparing the detected objects with the graphs from a database in the system, the methodology is able to identify object parts and to decide on the presence of the object of interest (human, bag, dog, etc.) in video sequences. The system tracks the movement of different object parts in order to combine them at a later stage to high-level semantics. For example, the motion pattern of each human body part is compared to the motion pattern of the known activities. The recognized movements of the body parts are combined by a classifier to recognize the overall activity of the human body.

22 Claims, 5 Drawing Sheets

U.S. PATENT DOCUMENTS 7,088,846 B2 * 8/2006 Han et al. .................. 382/103
2003/0107649 A1 6/2003 Flickner
2004/0131254 A1 * 7/2004 Liang et al. ................ 382/181
2004/0141635 A1 * 7/2004 Liang et al. ................ 382/110

* cited by examiner

501 Regions

502 Contours

METHOD AND APPARATUS FOR AUTOMATED VIDEO ACTIVITY ANALYSIS

CROSS REFERENCE TO RELATED APPLICATIONS

This application claims the priority of provisional U.S. application Ser. No. 60/406,567, filed on Aug. 27, 2002 and entitled "A System For Object Detection And Motion Classification In Compressed And Uncompressed Domains" by I. Burak Ozer and Wayne H. Wolf, the entire contents and substance of which are hereby incorporated in total by reference.

BACKGROUND OF THE INVENTION

1. Field of Invention

The invention is a new method and apparatus to detect the presence of articulated objects, e.g. human body, and rigid objects and to identify their activities in compressed and uncompressed domains and in real-time. The invention is used in a multiple camera system that is designed for use in indoor and outdoor environments. Possible applications of the invention are applications in law enforcement e.g. security checkpoints, home security, public places, experimental social sciences, entertainment e.g. virtual rooms, smart rooms, in monitoring e.g. interior of plane, car, train or in monitoring outdoor environments e.g. streets, bus stops, road-sides, etc.

2. Description of Related Art

Background of the Invention

Recent advances in camera and storage systems are main factors driving the increased popularity of video surveillance. Prices continue to drop on components e.g. CMOS cameras while manufacturers have added more features. Furthermore, the evolution of digital video especially in digital video storage and retrieval systems is another leading factor. Besides the expensive surveillance systems, today's PC-based, easy plug-in surveillance systems are directed at home users and small business owners who cannot afford the expense of investing thousand of dollars for a security system. Real time monitoring from anywhere, anytime enable keeping a watchful eye on security areas, offices, stores, houses, pools or parking garages.

Although these surveillance systems are powerful with new advances in camera and storage systems, automatic information retrieval from the sequences, e.g. rigid and non-rigid object detection and activity recognition in compressed and uncompressed domains, is not mature yet. These topics are still open areas for many research groups in industry, government, and academy.

Early activity recognition systems used beacons carried by the subjects. However, a system that uses video avoids the need for beacons and allows the system to recognize activities that can be used to command the operation of the environment.

As described in patents entitled "Method and Apparatus for real-time gesture recognition" by Katerina H. Nguyen, U.S. Pat. Nos. 6,072,494 and 6,256,033, a gesture recognition system is invented that compares the input gesture of the subject e.g. human figure with the known gestures in the database. Unlike the invention described herein, this approach is not modular as it recognizes the gesture of the whole human body figure. The same gesture, e.g. arm flapping can be performed by different subjects, birds, human, etc., where the subject of interest is not identified by the system. Another drawback of such a system is that it can easily fail when the subject figure is occluded.

As described in a patent entitled "Method and Apparatus for Detecting and Quantifying Motion of a Body Part", U.S. Pat. No. 5,148,477, a system for body part motion is invented. Unlike the invention described herein, this approach is adapted to analyze facial movement, e.g. movement of eyebrows. The system does not classify different body parts of the human, it assumes that the object of interest is face. Unlike the system described herein, the system is purely dependent on the pixel change between two frames without using any classification and recognition information and any high level semantics.

U.S. Pat. No. 6,249,606 describes a system for computer input using a cursor device in which gestures made by a person controlling the cursor are recognized. In contrast, our system is not limited to use with a cursor device or to computer input applications. U.S. Pat. Nos. 6,222,465, 6,147,678, 6,204,852, and 5,454,043 describe computer input systems that recognize hand gestures; in contrast, our system is not limited to computer control of a virtual environment or to hand gestures. U.S. Pat. Nos. 6,057,845 and 5,796,406 are also directed to computer input devices and not the more general case of activity analysis solved by our invention.

As described in the patent application entitled "Method of detecting and tracking groups of people" by Myron D. Flickner, U.S. patent application No. 20030107649, a human tracking and detection system is invented that compares objects to "silhouette" templates to identify human and then uses tracking algorithm to determine the trajectory of people. This system does not try to understand the activity of the people, nor does it try to find the human-object interaction as our invention can do.

As described in a paper delivered at the Workshop on Artificial Intelligence for Web Search 2000 entitled "Visual Event Classification via Force Dynamics" authored by Siskind, a system, which classifies simple motion events, e.g. pick up and put down by using single camera input is presented. The system uses "force-dynamic" relations to distinguish between event types. A human hand performs pick-up and put-down gesture. The system works for stable background and colored objects. However, the system doesn't identify hand or other objects in the scene.

As reported in the IEEE Computer Vision and Pattern Recognition Proceedings 1997, entitled "Coupled Hidden Markov Models (HMM) for Complex Action Recognition" by Matthew Brand, Nuria Oliver, and Alex Pentland, a hand gesture recognition system is described. The system recognizes certain Chinese martial art movements. However, the hands are assumed to be recognized a-priori. The system doesn't detect and classify hands before gesture recognition step. The movement of one hand depends on the movement of the second hand, where freedom of motion of the hands is limited by the martial art movements.

Parameterized-HMM, as reported in IEEE Transactions on Pattern Recognition and Machine Intelligence, Volume 21, No 9, Sep. 1999, entitled, "Parametric Hidden Markov Models for Gesture Recognition" authored by Wilson and Bobick, can recognize complex events e.g. an interaction of two mobile objects, gestures made with two hands (e.g. so big, so small), etc. One of the drawbacks of the parameterized HMM is that for complex events (e.g. a combination of sub-events) parameter training space may become very large.

In summary, most of the activity recognition systems are suitable for a specific application type. The invention described herein can detect a wide range of activities for different applications. For this reason, the scheme detects different object parts and their movement in order to combine them at a later stage that connects to high-level semantics. Each object part has its own freedom of motion and the activity recognition for each part is achieved by using several HMMs in parallel.

SUMMARY OF THE INVENTION

Explanation of some terms and abbreviations that are used throughout the text:

Parametric representation: Using abstract shapes with several parameters (typically fewer than 50) to represent a complex shape object such as human body parts.

Video sequence: A sequence of images that gives one or more activities recognizable by human being. A video sequence can be any video recording or media (e.g. an MPEG-1 file, a video tape, a video disc, a DVD, etc)

FPGA: FPGA or Field Programmable Gate Array is a type of programmable or configurable circuit.

Platform FPGA: High-density FPGAs used to provide core function of a system instead of just used as 'glue logic' that coordinate main functional units together.

Special-purpose hardware: Any single-purpose hardware unit, including but not limited to one or more FPGAs or other configurable logic, ASIC(s), or a custom chip(s).

Video signal processor: A programmable computer used for video processing.

TriMedia processor: A series of video processors produced by TriMedia Inc. (Now part of Philips).

PC: General personal computer (including desktop computers, servers, and/or laptop computers)

The present system can recognize activities in the compressed and uncompressed domains. Depending on the application and image resolution, a compact and a modular representation of the object is used.

First, in order to recognize the overall human body posture in the compressed domain, an eigenspace representation of human silhouettes obtained from AC values of the Discrete Cosine Transform (DCT) coefficients, is used.

The system of present invention can use AC-DCT coefficient differences and compare them in order to classify the up/down and left/right movements of the human body silhouette in real-time.

Posture recognition result helps the system to decide between two possibilities, storing the frames with a particular posture, e.g. pointing to the right, in a database and/or processing input frames, starting with this particular posture, for activity recognition purposes for a certain number of frames or until detecting another particular posture. The system is capable of using compressed domain and stored, e.g. MPEG Inter-frames, as well as uncompressed domain real-time video inputs.

The system of the present invention can detect non-rigid (e.g. human body) and rigid object parts and recognize their activities in compressed and uncompressed domains. To achieve this, a method with two levels, namely low and high levels, is used. The low-level part performs object detection and extracts parameters for the abstract graph representation of the image being processed. The high level part uses dynamic programming to determine the activities of the object parts, and uses a distance classifier to detect specific activities.

Low-level part performs object detection and extracts parameters for the abstract graph representation of the frame being processed in real time. Local consistency based on low level features and geometrical characteristics of the object regions is used to group object parts. Furthermore, higher order shape metrics is needed for the presentation of the complex objects. The object is decomposed for its presentation as a combination of component shapes. The result will be unaffected by a partial occlusion of the object.

The system is capable of managing the segmentation process by using object-based knowledge in order to group the regions according to a global consistency and introducing a new model-based segmentation algorithm by using a feedback from relational representation of the object. The major advantages of the model-based segmentation can be summarized as improving the object extraction by reducing the dependence on the low-level segmentation process and combining the boundary and region properties. Furthermore, the features used for segmentation are also attributes for object detection in relational graph representation.

The system is also capable of 2D approximation of object parts by fitting closed curves with shape preserving deformations that provide satisfactory results. It helps to disregard the deformations due to the clothing.

The selected unary and binary attributes are further extended for application specific algorithms.

Object detection is achieved by matching the relational graphs of objects with the reference model. This method maps the attributes, interprets the match and checks the conditional rules in order to index the parts correctly. This method improves object extraction accuracy by reducing the dependency on the low-level segmentation process and combining the boundary and region properties. Furthermore, the features used for segmentation are also attributes for object detection in relational graph representation. This property enables to adapt the segmentation thresholds by a model-based training system.

After the detection of the object parts, the system is ready to recognize the activities of each object part and the overall activity of the object.

For example, if the object of interest is a human body, the system will first detect different object parts, e.g. hands, head, arms, legs, torso and compare these part attributes with the human model attributes via graph matching. If the object of interest is a rigid object the system will detect object parts and compare the attributes of these parts with the object model via graph matching. The high level part uses a pattern classifier, namely Hidden Markov Models, which classifies activity patterns of the body parts in space-time and determines the movements of the object parts. It also uses a distance classifier to detect specific gestures and activities. For articulated objects like human body, the system will find the activities of each body part independently from each other and combine the activities to find the gesture and overall activity of the human body at a later stage by using a quadratic distance classifier.

Note that, each object part has its own freedom of motion. The activity recognition for each part is achieved by using several HMMs in parallel.

Combining activities for different rigid and non-rigid object parts and generating scenarios are purely application dependent issues. For each type of application the part activities are combined with different weights and generated different scenarios for these particular applications.

Other advantages of the invention are, that the system is fast, robust and has a very low latency and a high accuracy rate for rigid and non-rigid object part detection and activity classification. Additionally, compressed domain methods reduce computational complexity, to avoid dependency on correct segmentation and reduce storage area and bandwidth requirements. Finally, a multi-camera/multi-processor system using a PC as a host allows evaluating the algorithms running on real-time data.

Figure 3:
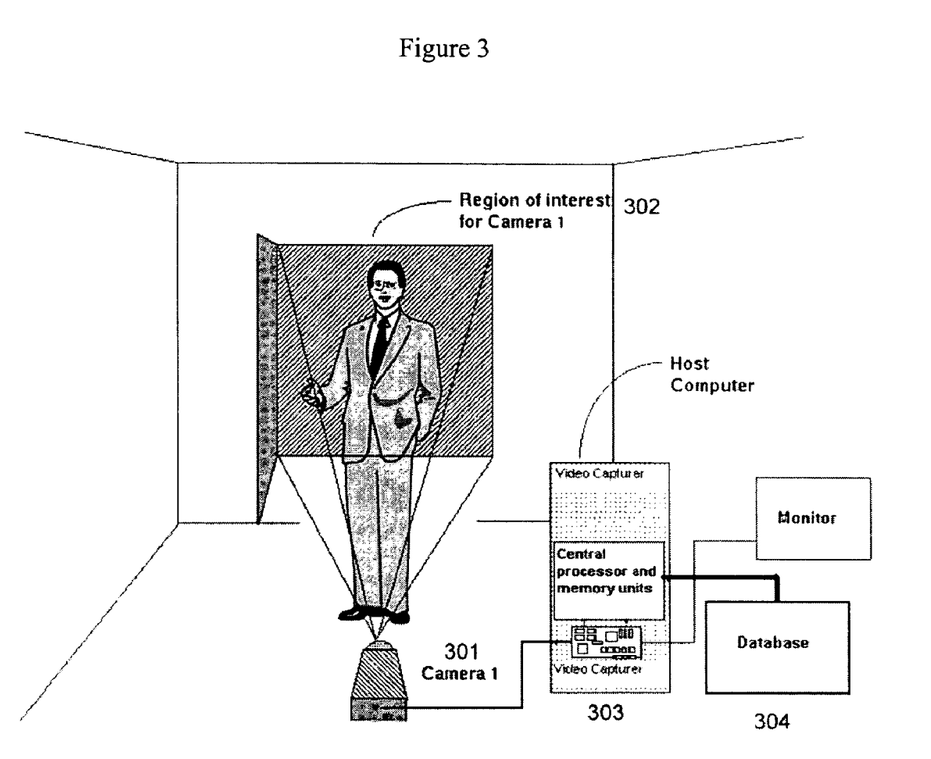
FIG. 3 is a schematic view of the object detection and activity recognition apparatus.

FIG. 3 is a schematic view of the object detection and activity recognition apparatus. The apparatus includes a monitor, analog or digital cameras, a personnel computer (PC) including a database for objects, a database for activities, video capturer, central processor, buffers and other memory units.

The video frames are sent from the camera to the video capturer on the PC. The video capturer converts the frames sent from the camera from analog format to digital format and stores the color components of the current frame in three different buffers.

The color components stored in the buffers are further processed by the central processor to classify the object regions. Region parameters are compared with the object parameters in the object database and the region is classified.

Spatial information of the classified object regions is stored in the memory unit.

After a certain number of frames the sequential spatial information stored in the memory unit is compared with the activity database by the central processor for each object region in parallel.

The output activities of the object parts are further processed by the central processor to find the overall activity of the object.

DETAILED DESCRIPTION OF THE INVENTION

Overview

Figure 1:
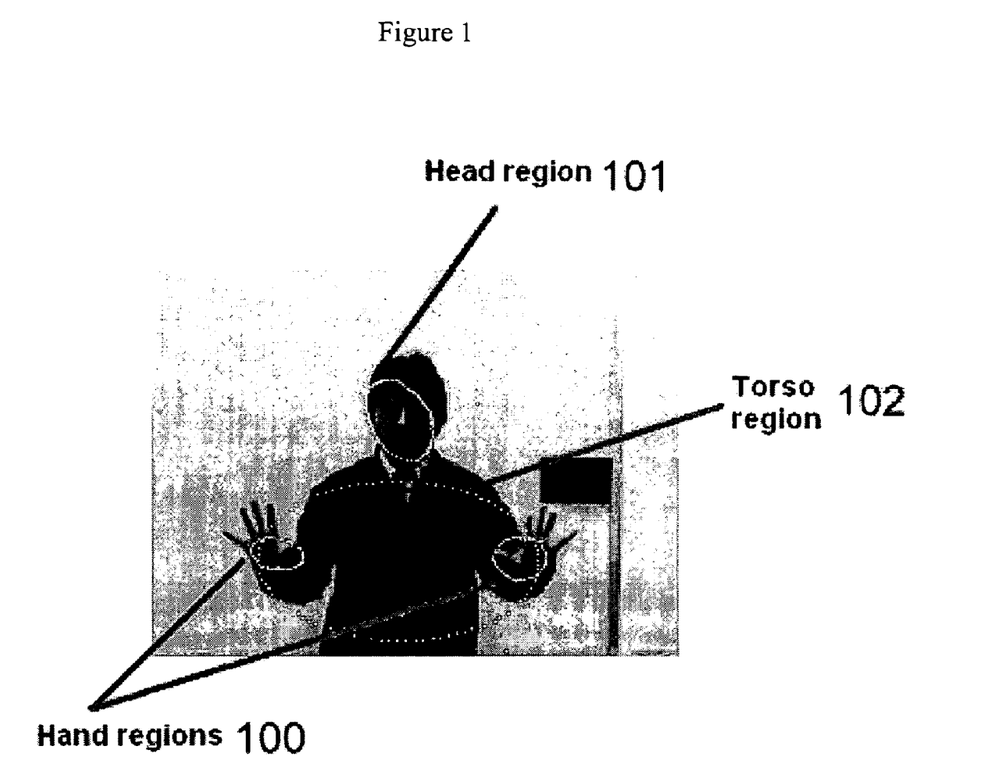
FIG. 1 is a pictorial view of the object parts and fitted closed curves (Object of Interest is "human").

Most of the existing commercial video security systems are only based on simple motion detection algorithms, where the systems are unable to classify the detected object or to detect the occurrence of events, e.g. suspicious movement. On the other hand, although there has been a great deal of research done for object detection and tracking, the existing solutions are not scalable and their real-time applicabilities are limited. Since the personnel cannot pay constant attention to the monitors, the effectiveness of traditional surveillance systems is limited. Systems equipped with the proposed algorithm would increase effectiveness by calling attention to the cameras that capture unattended objects such as, but not limited to, unattended bag in a metro station or unattended package next to a public building, identify intrusion and detect suspicious activities, reduce the need for monitors and supervisory personnel and transfer low-level video data to other security points in real-time for immediate response. Our invention is also useful for applications other than security, such as tracking the activities of employees for human factors studies or identifying the activity of customers for marketing studies. As shown in FIG. 1, the system can identify each object part separately (in this case hands 100, head 101, and torso 102) after comparing the object attributes with the model database via a graph-matching algorithm.

In this system, the user can determine the actions taken when the system helps the user identify suspicious activity. The system can easily be set up to classify several objects of interest, such as, but not limited to, human, bag, dog, and to recognize a wide variety of activities, such as gestures ranging from pointing a gun to waving arms, leaving unattended objects, entering a prohibited area, tailgating at security doors, spending too much or too little time in an area, etc. or to detect the direction of movement of a rigid object, such as, but not limited to, a truck which is speeding towards the security gate at a nuclear facility, etc.

Libraries of activities determine what events cause the system to set an alarm. The user can add to the library and turn actions in the library on and off at will. Most video analysis systems use simple methods such as motion detection. However, since motion detection and tracking don't know what is moving, they can easily generate false alarms as well as missing important events. In contrast, this system builds a model of the object of interest on each video frame. It tracks only objects that fit the model of the user defined subject, such as human, any rigid object, dog. This makes the system more accurate because it easily rejects many elements in the scene that may be moving but are not objects of interest.

FIG. 3 illustrates our overall system in use. In this figure, camera 301 views a region of interest 302. Camera 301 is connected to a computer 303. The computer 303 may keep a database of graphs, HMM models, and other information used during video analysis.

Figure 4:
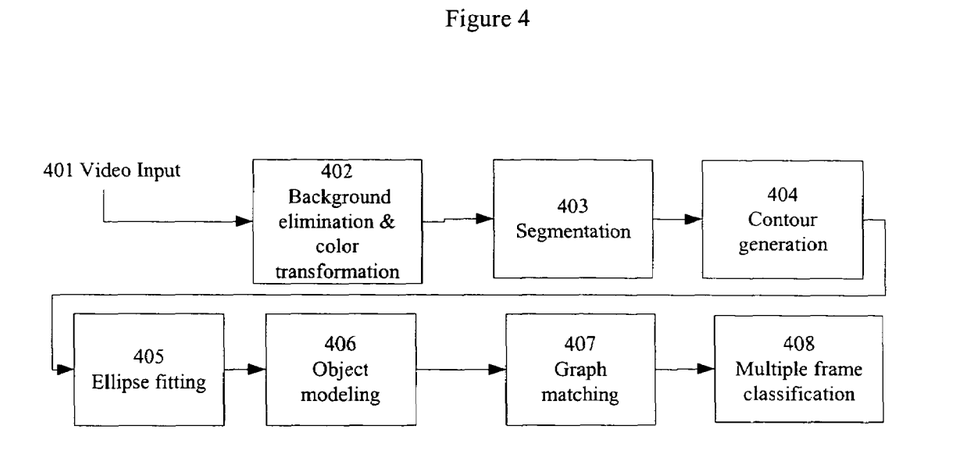
FIG. 4 is a block diagram of our system.

FIG. 4 shows a block diagram of our invention. The video input 401 may be from an analog camera whose video data has been suitably digitized or from a digital camera. A variety of video input formats can be used. The various elements in the block diagram will be described in more detail below.

This patent describes exemplary implementations of our invention but the invention is not limited to the components and details described here.

Early Stage Analysis

Background elimination and color transformation: The first step (402) is the transformation of pixels into another color space regarding to the application. Background elimination is performed by using these transformed pixel values for the current and background images. The foreground-background separation is achieved by comparing the DC coefficients of the foreground object with the DC coefficients of the background object via a statistical method.

Segmentation: In 403, the foreground regions are extracted and the object of interest is segmented hierarchically into its smaller unique parts based on the combination of color components and statistical shape features after background elimination. The meaningful adjacent segments are combined and used as the input of the following algorithm steps.

Figure 5:
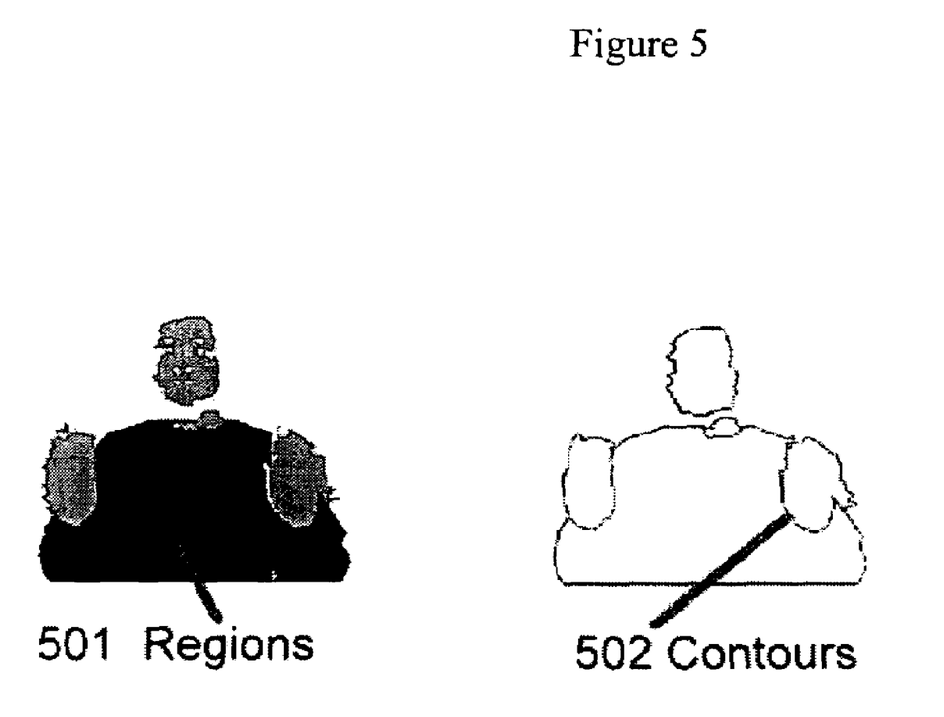
FIG. 5 shows an example of contour generation.

Contour following: Contour points of the segmented regions are extracted and stored (404). FIG. 5 gives an example of contour following: the frame given to the contour following algorithm 501 results in the output frame with the contour 502.

Ellipse fitting: This step (405) fits ellipses to the contours. Even when object of interest is not occluded by another object, due to the possible positions of non-rigid parts an object part can be occluded in different ways. In this case, 2D approximation of parts by fitting ellipses with shape preserving deformations provides more satisfactory results. It also helps to discard the deformations.

Object modeling by invariant shape attributes: For object detection, it is necessary to select part attributes which are invariant to two-dimensional transformations and are maximally discriminating between objects (406).

Graph matching: In this step (407), we compare the object model with a set of stored models. Each extracted region modeled with ellipses corresponds to a node in the graphical representation of the object of interest. Each object part and meaningful combinations represent a class w where the combination of binary and unary features are represented by a feature vector X and computed off-line. The combination of segments is controlled by the reference model and by the rule generator. If the graph-matching algorithm cannot find a meaningful correspondence of the combined segments in the reference model, the combination will be rejected and a new combination will be generated. For the purpose of determining the class of these feature vectors a piecewise quadratic Bayesian classifier with discriminant function g(X) is used. The generality of the reference model attributes allows the detection of different kind of models for the same object type while the conditional rule generation decreases the rate of false alarms. The computations needed for each node matching are then a function of the feature size and the previously matched nodes of the branch under consideration. The marked regions are tracked by using ellipse parameters for the consecutive frames and graph-matching algorithm is applied for new objects appearing in the other regions.

Classifying Over Multiple Frames

Figure 2:
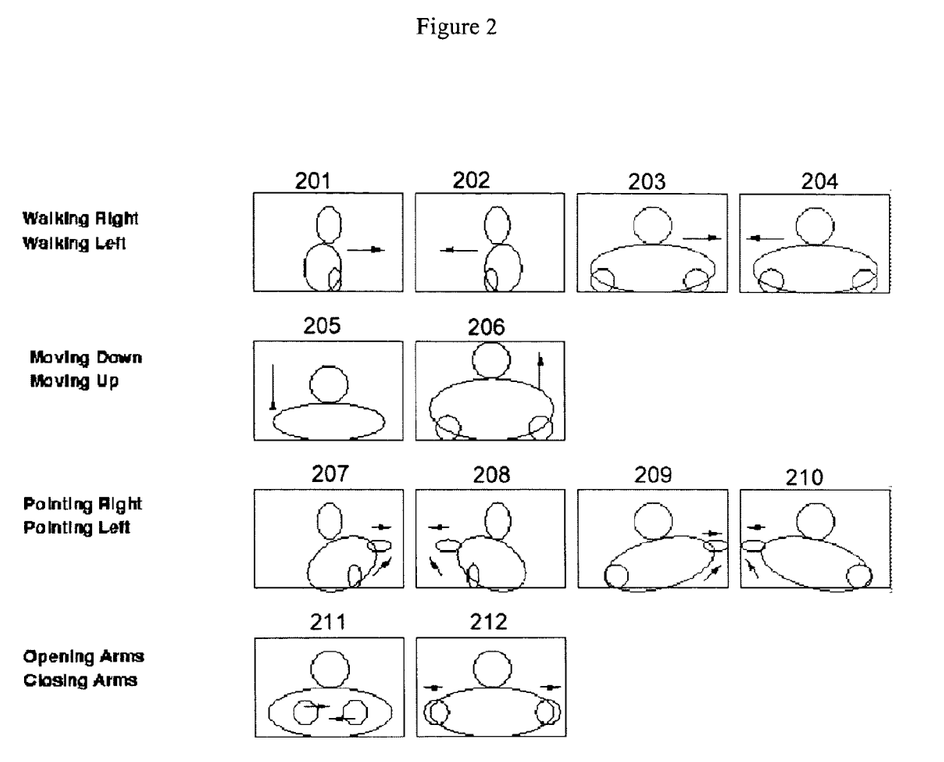
FIG. 2 is a diagrammatic, schematic view of some of the recognized activities.

Output of the graph-matching algorithm is the classified object parts. The movements of the object parts are described as a spatio-temporal sequence of feature vectors that consist of the direction of the object part movement. The system checks direction of the movements of the object parts for a number of frames and calculates the probabilities of the activities with the known activities by using Hidden Markov Models and chooses the pattern with the highest probability as the recognized activity in these frames (408). The activity of each part is then combined by a quadratic distance classifier to find the overall activity of the object of interest. As shown in FIG. 2, frame 201 shows walking right and frame 202 shows walking left.

The basis of this invention relies on the combination of the modular parts that form logical semantics at each stage. The lowest level consists of low-level regions. The combination of regions corresponds to object parts. The combination of object parts defines the object while the combination of the movements of different parts determines the gesture and activities. The combination of the activities defines the event in the scene. The same approach is then used to teach the system different objects, activities and events. Therefore, the user-defined semantics are entered as up-bottom approach. For example, the event of pointing a gun can be decomposed to different levels such as the relative location of arms, hands and torso and the combined movements of arms and hands.

The attached Exhibit A and Exhibit B include disclosure materials directed to various aspects of the invention.

It will be understood that the forgoing description of the invention is by way of example only, and variations will be evident to those skilled in the art without departing from the scope of the invention, which is as set out in the appended claims.

The invention claimed is:

1. A method for detection the parts of the non-rigid object such as, but not limited to, human body, and for recognition gestures and activities of the object of interest in real-time video sequences comprising:
   a) Eliminating the background to obtain the foreground objects;
   b) Detecting different regions of the foreground objects by using color and/or shape information;
   c) Finding the contours of the areas cited in 1b);
   d) Fitting closed curves to the contours cited in 1c);
   e) Computing unary and binary attributes for the closed curves cited in 1d);
   f) Comparing the attributes cited in 1e) with the object attributes in the training data set via a matching algorithm and determining object parts after matching;
   g) Combining adjacent segments and repeating claims 1c) through 1f);
   h) Storing 2D center of gravity coordinates of each object part in the buffers for certain number of frames;
   i) Comparing the change of center of gravity coordinates with time for each object part cited in 1h) with the templates in the training data set and recognizing the activity of each part separately;
   j) Combining the activities of the object parts cited in 1h) and recognizing the overall activity of the object of interest in the scene; and,
   k) Combining the gestures and activities of different objects to detect the event in the scene.

2. The method of claim 1 wherein step 1a) further comprises:
   a) Grabbing and digitizing several video frames under different lighting changes;
   b) Converting input color components into a single color space or a combination of color spaces such as, but not limited to, red-green-blue color space, luminance-chrominance color space, hue-saturation color space, etc., or a combination of them;
   c) Generating a statistical model for background frames by using the mean and standard deviation of frame blocks and color components cited in 2b);
   d) Grabbing and digitizing test video frame and repeating step 2b) for the test frame;
   e) Generating a statistical model for test frame by using the mean and standard deviation of frame blocks and color components cited in 2d); and,
   f) Comparing the mean and/or standard deviation of the frame blocks of the test frame cited in 2e) with the mean and/or standard deviation of the background frames cited in 2c).

3. The method of claim 2 wherein step 2f) further comprises:
   eliminating the blocks with similar mean and standard deviation that are below a threshold from the test frame and generating a foreground region.

4. The method of claim 3 further comprising:
   Segmenting foreground regions cited in 3 of the object of interest hierarchically into its smaller unique parts based on the combination of color components and statistical shape features.

5. The method of claim 4 wherein the segmenting step based on statistical shape features further comprises:
   Comparing the curvature, mean, deviation of the object of interest with the known model shape features for different objects.

6. The method of claim 4 further comprising:
a) Assigning a number to pixels contained in the segmented foreground regions and assigning another number to the non-foreground regions and generating a binary image; and,
b) Determining and storing contour coordinates of the segmented regions cited in claims 1b) and 6a) in a buffer.

7. The method of claim 6 wherein step 6b) further comprises:
a) Initializing multiple 3 by 3 pixel windows;
b) Shifting the windows through the binary image cited in 6a) in different and independent directions; and,
c) Finding the next neighboring point on the outer boundary of the foreground object segment cited in 4a) after one of the window centers overlaps with the foreground object segment.

8. The method of claim 7 wherein the step 1j) further comprises:
a) Generating weighted feature vectors by using recognized activities of the object parts;
b) Adding speed of object parts as a new feature to feature vector; and,
c) Classifying feature vectors by using distance classifier.

9. The method of claim 8 wherein the step 1k) further comprises:
Combining activities of different object, such as but not limited to, rigid objects and human to detect the event in the scene.

10. The method of claim 1 wherein step 1d) further comprises:
Approximating contours by fitting closed curves with shape preserving deformations for minimizing the effect of occlusion and local deformations.

11. The method of claim 1 wherein step 1e) further comprises:
Determining geometric invariant attributes for closed curves that are maximally discriminating between objects.

12. The method of claim 1 wherein step 1f) further comprises:
a) Generating attribute feature vectors for each closed curve where each object part and meaningful combinations represent a class;
b) Determining the class of the multi-dimensional feature vector by using quadratic Mahalanobis classifier; and,
c) Evaluating a discriminant function and checking conditional rule generation and previously matched node pairs.

13. The method of claim 1 wherein step 1g) further comprises:
a) Combining or further segmenting results of low level segmentation cited in claim 2 by using model-based segmentation;
b) Managing the segmentation process using a feedback from relational representation of the object; and,
c) Combining resulting segments produced from this initial segmentation by using a bottom-up control.

14. The method of claim 1 wherein steps 1h) and 1i) further comprise:
a) Storing the center of gravity points of the detected human body parts between motion gaps in the buffer;
b) Comparing the spatio-temporal pattern of each body part movement and the combination of several patterns with the training set pattern for different body part movements by using dynamic programming and choosing the pattern with the highest probability as the recognized activity of the body part.

15. An apparatus for implementing the activity recognition method of claim 1, said apparatus comprising:
a) A video signal processor;
b) A general purpose computer; and,
c) A special-purpose hardware unit.

16. A method for detection human body postures and for recognition global direction of the body in compressed domain, said method comprising:
a) Eliminating background to obtain the foreground object in compressed domain;
b) Windowing the foreground object cited in 15a) and scaling the window in compressed domain by using the human body proportions;
c) Comparing AC coefficients of the scaled window cited in 15b) with the AC coefficients of different human postures in the database and recognizing posture of the human in the scene; and,
d) Comparing horizontal AC coefficient differences with the vertical AC coefficient differences and obtaining global activity of the body in compressed domain.

17. The method of claim 16 wherein step 15a) further comprises:
d) Extracting quantized DCT coefficients of the Intra frames from MPEG decoder;
e) Extracting quantized DCT coefficients from JPEG decoder; and,
f) Calculating DCT coefficients in real-time.

18. The method of claim 16 wherein step 15b) further comprises:
a) Windowing the foreground object by using human body proportions for different postures; and,
b) Scaling the window in compressed domain.

19. The method of claim 16 wherein step 15c) further comprises:
a) Computing the principal components of the energy distribution of human bodies;
b) Computing eigenvectors and eigenvalues of the covariance matrix of the human body images;
c) Calculating a set of weights based on the input image and the eigenvectors by projecting the input image onto each of the eigenvectors; and,
d) Detecting human regions by computing the distance between the mean adjusted input image and its projection onto human body space.

20. The method of claim 16 wherein step 15d) further comprises:
a) Eliminating areas without motion in compressed domain; and,
b) Comparing horizontal and vertical AC coefficient differences between frames and grouping coefficient differences regarding to the human body proportion for finding the global body part activity.

21. An apparatus for implementing the activity recognition method of claim 16, said apparatus comprising:
a) A video signal processor;
b) A general purpose computer; and,
c) A special-purpose hardware unit.

22. A method for detection the rigid object parts and for recognition activities of a rigid object in real-time video sequences comprising:
a) Eliminating the background to obtain the foreground objects;
b) Detecting different regions of the foreground objects by using color and/or shape information;
c) Finding the contours of the areas cited in 22b);

d) Fitting closed curves to the contours cited in 22c);
e) Computing unary and binary attributes for the closed curves cited in 22d);
f) Repeating claims 22a) through 22e) and comparing the object attributes with the model object attributes in the training data set via a matching algorithm and determining the object parts;
g) Combining adjacent segments and repeating claim 22f);
h) Storing 2D center of gravity coordinates of rigid object parts in the buffer for certain number of frames;
i) Comparing the change of center of gravity coordinates with time for each object part cited in 22h) with the templates in the training data set and recognizing the activity of object parts; and,
j) Combining the activities of the object parts cited in 22i) and recognizing the overall activity of the object in the scene.

* * * * *